United States Patent
Singh

(10) Patent No.: US 9,647,522 B2
(45) Date of Patent: May 9, 2017

(54) LINEAR INDUCTION GENERATOR USING MAGNETIC REPULSION

(71) Applicant: Ishwar Ram Singh, Mississauga (CA)

(72) Inventor: Ishwar Ram Singh, Mississauga (CA)

( * ) Notice: Subject to any disclaimer, the term of this patent is extended or adjusted under 35 U.S.C. 154(b) by 137 days.

(21) Appl. No.: 14/264,438

(22) Filed: Apr. 29, 2014

(65) Prior Publication Data

US 2015/0311775 A1    Oct. 29, 2015

(51) Int. Cl.
| | | |
|---|---|---|
| *H02K 35/02* | (2006.01) | |
| *F03D 3/00* | (2006.01) | |
| *F03D 9/00* | (2016.01) | |
| *H02K 7/06* | (2006.01) | |
| *H02K 7/11* | (2006.01) | |

(52) U.S. Cl.
CPC ............ *H02K 35/02* (2013.01); *F03D 9/002* (2013.01); *F05B 2210/16* (2013.01); *H02K 7/06* (2013.01); *H02K 7/11* (2013.01); *Y02E 10/725* (2013.01)

(58) Field of Classification Search
CPC ........ H02K 35/02; H02K 7/06; H02K 7/1869; H02K 7/1876; H02K 41/02; F03D 3/005; F03D 9/002
USPC ............ 290/1 R, 44, 55; 310/15, 20, 40 R, 310/49.18, 157
See application file for complete search history.

(56) References Cited

U.S. PATENT DOCUMENTS

| | | |
|---|---|---|
| 3,149,254 A | 9/1964 | Carter et al. |
| 4,011,477 A | 3/1977 | Scholin |
| 4,639,626 A | 1/1987 | McGee |
| 5,347,186 A * | 9/1994 | Konotchick ......... H02K 7/1876 310/17 |
| 5,975,714 A | 11/1999 | Vetorino et al. |
| 6,232,689 B1 * | 5/2001 | Fujita ...................... F16F 6/005 310/103 |
| 7,323,790 B2 * | 1/2008 | Taylor ................. F03B 13/1895 290/42 |
| 7,498,682 B2 | 3/2009 | Lemieux |
| 7,573,163 B2 | 8/2009 | Tu et al. |

(Continued)

FOREIGN PATENT DOCUMENTS

| | | |
|---|---|---|
| CN | 102097906 A | 6/2011 |
| WO | WO 02/27899 A1 | 4/2002 |
| WO | WO 2010/144067 A1 | 12/2010 |

OTHER PUBLICATIONS

International Searching Authority (ISA/CA), International Search Report and Written Opinion, mailed Jul. 16, 2015, for corresponding International Patent Application No. PCT/CA2015/000256.

*Primary Examiner* — Tulsidas C Patel
*Assistant Examiner* — Viet Nguyen
(74) *Attorney, Agent, or Firm* — Gowling WLG (Canada) LLP

(57) ABSTRACT

An electrical generator and method for generating electricity are provided using a linear induction generator that operates based on magnetic repulsion. The electrical generator includes a tube assembly having a tube with an induction coil surrounding the tube and an induction magnet within the tube. A rotor assembly includes a rotor magnet that is positioned with an opposing magnetic moment to the induction magnet and moved in proximity to the induction magnet to cause it to repel the induction magnet causing it to move within the tube and generate and electromotive force in the induction coil surrounding the tube.

16 Claims, 4 Drawing Sheets

(56) References Cited

U.S. PATENT DOCUMENTS

| | | | |
|---|---|---|---|
| 7,884,519 B2 | 2/2011 | Okuno | |
| 8,013,464 B2 | 9/2011 | Stern et al. | |
| 8,154,144 B2* | 4/2012 | Muller | H02K 3/47 |
| | | | 290/53 |
| 8,203,228 B2 | 6/2012 | Smith | |
| 8,324,772 B2 | 12/2012 | Barbar | |
| 8,487,484 B1* | 7/2013 | Miller, Jr. | H02K 49/102 |
| | | | 310/12.14 |
| 8,492,936 B1* | 7/2013 | Waters | H02K 35/02 |
| | | | 310/103 |
| 8,975,764 B1* | 3/2015 | Abehasera | F03G 7/08 |
| | | | 128/202.21 |
| 2007/0120432 A1* | 5/2007 | Vaden | F01B 3/007 |
| | | | 310/80 |
| 2010/0253093 A1 | 10/2010 | MacDonald | |
| 2010/0276938 A1 | 11/2010 | Smith | |
| 2011/0193347 A1 | 8/2011 | Leijon et al. | |
| 2011/0298217 A1* | 12/2011 | Hochberg | F03B 13/00 |
| | | | 290/54 |
| 2012/0013131 A1 | 1/2012 | Yeh | |
| 2012/0104877 A1* | 5/2012 | Isaacs | H02K 35/02 |
| | | | 310/30 |
| 2012/0242086 A1 | 9/2012 | Yang | |
| 2012/0313457 A1 | 12/2012 | Raghuprasad | |
| 2013/0015667 A1* | 1/2013 | Fullerton | H02K 21/24 |
| | | | 290/1 A |
| 2013/0285479 A1* | 10/2013 | Kinoshita | H02K 35/02 |
| | | | 310/12.12 |
| 2014/0117786 A1* | 5/2014 | Gosvener | H02K 7/075 |
| | | | 310/23 |
| 2014/0239644 A1* | 8/2014 | Hochberg | H02K 7/1876 |
| | | | 290/54 |

* cited by examiner

LINEAR INDUCTION GENERATOR USING MAGNETIC REPULSION

FIELD

The present disclosure relates generally to generation of electricity. More particularly, the disclosure relates to linear induction electrical generators.

BACKGROUND

Electricity is typically generated by having magnets, either permanent magnets or electromagnets, attached to a rotor that pass in close proximity to a stationary set of conductors wound in coils, called the stator. The rotor is moved by kinetic energy that can be produced by wind, water, steam, etc. The electromagnetic field of the magnets on the rotor induces electrical current in the coils of the stator. FIG. 1 illustrates a prior art electrical generator design 100 that has a rotor 110 containing magnets than rotates within the stator 120 that contains the coils.

In the electrical generator design 100, the thickness of the coils on the stator 120 is limited by the size of the magnetic field of the magnets on the rotor 110. In order to produce more electricity using this design, more wire coils must be added to the stator 120 which increases the diameter and the rotor 110 must also increase in size to include more magnets that remain perpendicular to the coils on the stator 120. This causes the size and weight of the generator to be greatly increased. The main reason that utility grade wind turbines are so large is because a large force is require to rotate the weight of the rotor.

U.S. Pat. No. 8,203,228 to Smith, which is incorporated herein by reference, provides an improved aerogenerator that translates the rotary motion of the impeller into a reciprocating linear motion that moves a magnet within an induction coil to generate electricity. Smith describes a mechanical linkage that uses a rotatable cam plate in order to reciprocate the magnet within the induction coil. The mechanical linkage increases the size, weight, and costs of the generator.

A need therefore exists for an improved linear induction generator. Accordingly, a solution that addresses, at least in part, the above and other shortcomings is desired.

SUMMARY

According to a first aspect of the disclosure, an electrical generator is provided comprising a tube assembly having a tube with an induction coil surrounding the tube and an induction magnet within the tube, the induction magnet moveable longitudinally within the tube; and a rotor assembly having a rotor magnet, the rotor magnet positioned with an opposing magnetic moment to the induction magnet, wherein the rotor assembly is moved with respect to the tube assembly to cause the rotor magnet to move towards an end of the tube, the rotor magnet repels the induction magnet causing it to move within the tube and generate an electromotive force in the induction coil. The tube assembly can be vertical and as the rotor magnet moves away from the end of the tube, the induction magnet will drop within the tube due to gravity and generate a second electromotive force in the induction coil. The rotor magnet can also move in a plane perpendicular to a longitudinal axis of the tube. The induction coil can be a wire that is helically wrapped around the tube. In some aspects, the tube assembly can have a plurality of induction magnets and a plurality of induction coils, and can be configured to generate three-phase power. The rotor assembly can be mechanically coupled to a turbine or directly coupled to blades of a vertical axis wind turbine.

In some aspects, the electrical generator can have a plurality of tube assemblies, and also have a plurality of rotor magnets on the rotor assembly. In some aspects, the rotor assembly can have a rotatable disk adjacent the end of the tubes of the tube assembly, and the rotatable disk having the plurality of rotor magnets disposed thereon. The plurality of tube assemblies can be arranged toroidally. In some aspects, the rotor assembly can further include a second rotatable disk coupled to the first rotatable disk, and the second rotatable disk can be adjacent to an opposing end of the tubes of the tube assembly. The second rotatable disk can have secondary rotor magnets offset from corresponding rotor magnets, the secondary rotor magnets configured to repel the induction magnets. In some aspects, the tube assemblies can be positioned horizontally, and the second rotatable disk can comprise opposing rotor magnets positioned opposite from corresponding rotor magnets, the opposing rotor magnets configured to attract the induction magnets.

In a second aspect, there is provided a method for generating electricity comprising providing a tube assembly having a tube with an induction coil surrounding the tube and an induction magnet within the tube, the induction magnet moveable longitudinally within the tube; and moving a rotor magnet towards an end of the tube, the rotor magnet repels the induction magnet causing it to move within the tube and generate an electromotive force in the induction coil.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
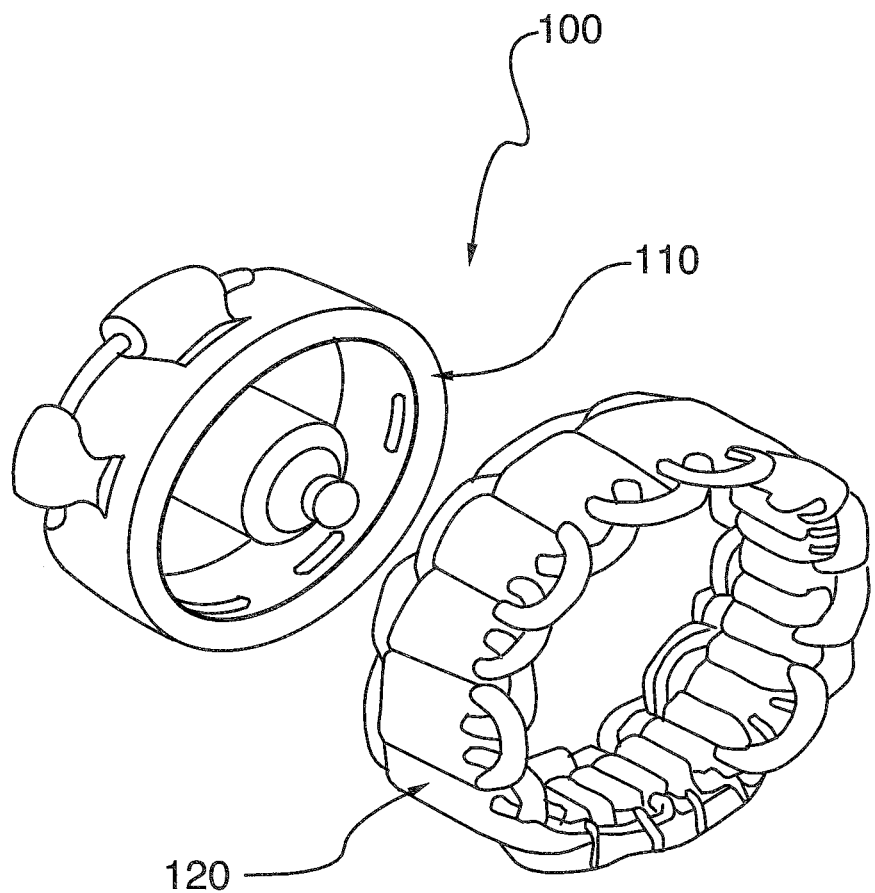
FIG. 1 is a diagram of a prior art electrical generator design using a rotor and stator.
Figure 2A:
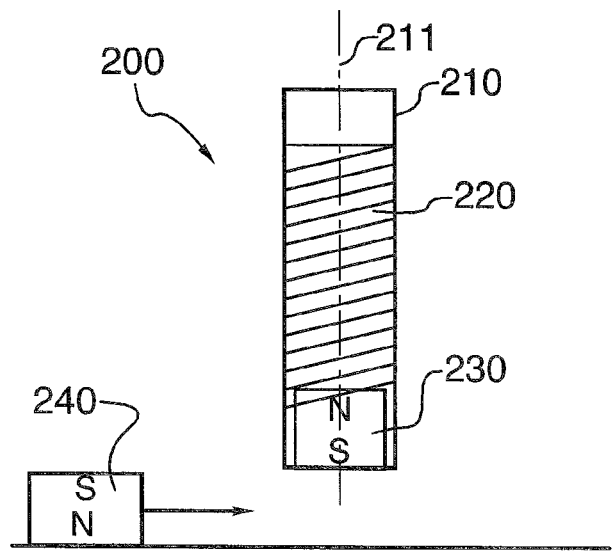
FIG. 2A is a side view of an electrical generator having an induction coil wrapped around a tube having an internal induction magnet in a resting position.

Referring first to FIG. 2A, shown is a side view of an embodiment of an electrical generator 200 comprising a tube 210 having an induction coil 220 of wire helically wrapped around its exterior and an induction magnet 230 that is free to move within tube 210. Induction magnet 230 is currently located at the bottom portion of tube 210 due to the force of gravity. Tube 210, coil 220 and induction magnet 230 provide a linear electric generator that generates an electromotive force ("emf") within the wire of coil 220 as the magnet 230 slides back and forth in tube 210.

Linear electric generators based on a moving magnet within a solenoid (a helically wound wire) are known. This type of electric generator is used in the Faraday flashlight, named after Faraday's law of induction upon which its operation is based, that uses a sliding magnet that moves back and forth through the center of a coil of copper wire when the flashlight is shaken. The aerogenerator taught by Smith, as described above, also uses a linear electric generator that mechanically reciprocates a magnet within an induction coil.

Electrical generator 200 further includes a rotor magnet 240. The term "rotor" is used to indicate that rotor magnet 240 would typically be coupled to the moving or rotating portion of electrical generator 200. Induction magnet 230 is so named because it induces the electromotive force (emf) in coil 220.

FIG. 2A illustrates rotor magnet 240 translating perpendicularly relative to axis 211 of tube 210. The magnetic moment of induction magnet 230 and rotor magnet 240 are aligned substantially parallel with axis 211 to provide a repulsion force between the two. The magnetic moment (or magnetic dipole moment) is a vector that points from the magnet's south pole towards its north pole. Induction magnet 230 and rotor magnet 240 are illustrated as having poles facing in opposite directions (denoted by "N" for north and "S" for south), and thus, induction magnet 230 and rotor magnet 240 have opposing magnetic moments.

Figure 2B:
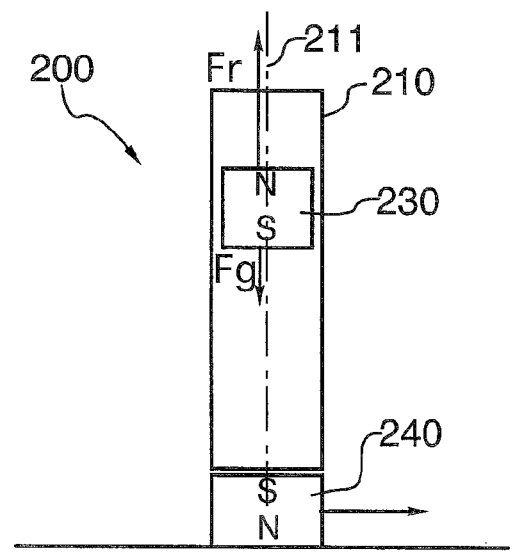
FIG. 2B is a cross-sectional view of the electrical generator of FIG. 2A with the induction magnet moving upwards within the induction coil from the repulsion force of a moving rotor magnet.

Referring next to FIG. 2B, shown is a cross-section of electrical generator 200 illustrating the interaction of induction magnet 230 and rotor magnet 240. When the magnetic fields of induction magnet 230 and rotor magnet 240 interact, induction magnet 230 is repelled and moves upwards within tube 210. Rotor magnet 240 is illustrated in alignment with axis 211 of tube 210 but the magnetic fields will interact as rotor magnet 240 approaches tube 210. Induction magnet 230 is constrained by tube 210 so that the magnetic repulsion force causes induction magnet to move upwards and maintain the direction of it magnetic moment (i.e. the orientation of its poles).

The force on induction magnet 230 from the repulsive magnetic force is illustrated by the vector labelled $F_r$ and the gravitational force is illustrated by the vector labelled $F_g$. The repulsive magnetic force is larger than the gravitational force causing the induction magnet to move upwards within tube 210. As noted above, movement of induction magnet 230 generates an electromotive force that induces a current in the wire of coil 220.

Figure 2C:
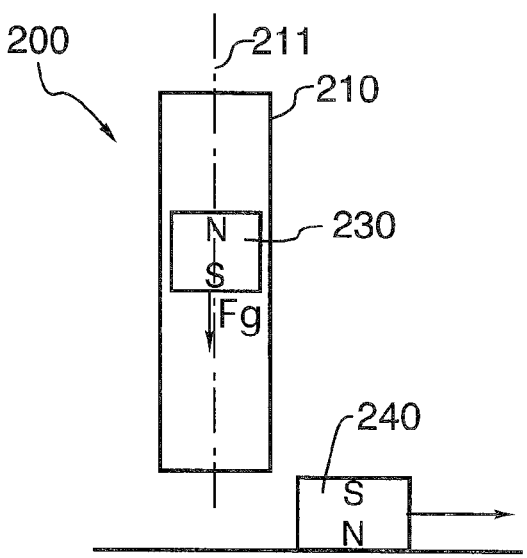
FIG. 2C is a cross-sectional view of the electrical generator of FIG. 2A with the induction magnet moving downwards within the induction coil.

Referring next to FIG. 2C, shown is a cross-section of electrical generator 200 illustrating rotor magnet 240 moving away from tube 210 so that the magnetic fields of rotor magnet 240 and induction magnet 230 no longer interact. Rotor magnet 240 no longer causes a magnetic repulsion force to act on induction magnet 230 and the gravitational force causes induction magnet 230 to move downwards within tube 210. This downward movement of induction magnet 230 will generate an electromotive force that induces a current in the wire of coil 220. This emf and current will be opposite from that generated from the upwards movement illustrated in FIG. 2B, and will thus cause an alternating current within the wire of coil 220.

In order to generate a continuous alternating current, rotor magnet 240 is continually moved into and out of the magnetic field of induction magnet 230. Rotor magnet 240 can be mechanically coupled to a turbine in order to continuously generate electricity. A turbine converts the kinetic and potential energy from a working fluid into a rotational movement. The turbine includes a rotor, which is a shaft or drum with blades attached. The moving fluid acts on the blades so that they impart rotational energy to the rotor. The turbine can be driven by water, wind, steam or other sources of fluid energy, and can include, for example, steam turbines, gas turbines, reciprocating engines, hydro turbines, and wind turbines. Rotational movement may also be provided by a motor coupled to the generator 200. The motor may be driven by electricity, heat (e.g. a Stirling engine), gas, diesel, hydrogen, or other power source.

In one embodiment, rotor magnet 240 can be mechanically coupled to a turbine to move rotor magnet 240 in a plane perpendicular to axis 211 of tube 210 as shown in FIGS. 2A-C. In other embodiments, rotor magnet 240 can be mechanically coupled to reciprocate axially with respect to tube 210.

Some embodiments of electrical generator 200 can include multiple tubes 210, each with an induction magnet 230 and induction coil 220, that can interact with a rotor magnet 240. Still other embodiments can include multiple tubes 210, each with an induction magnet 230 and induction coil 220, and multiple rotor magnets 240 that interact with each of the multiple tubes 210 and induction magnets 230.

Figure 3:
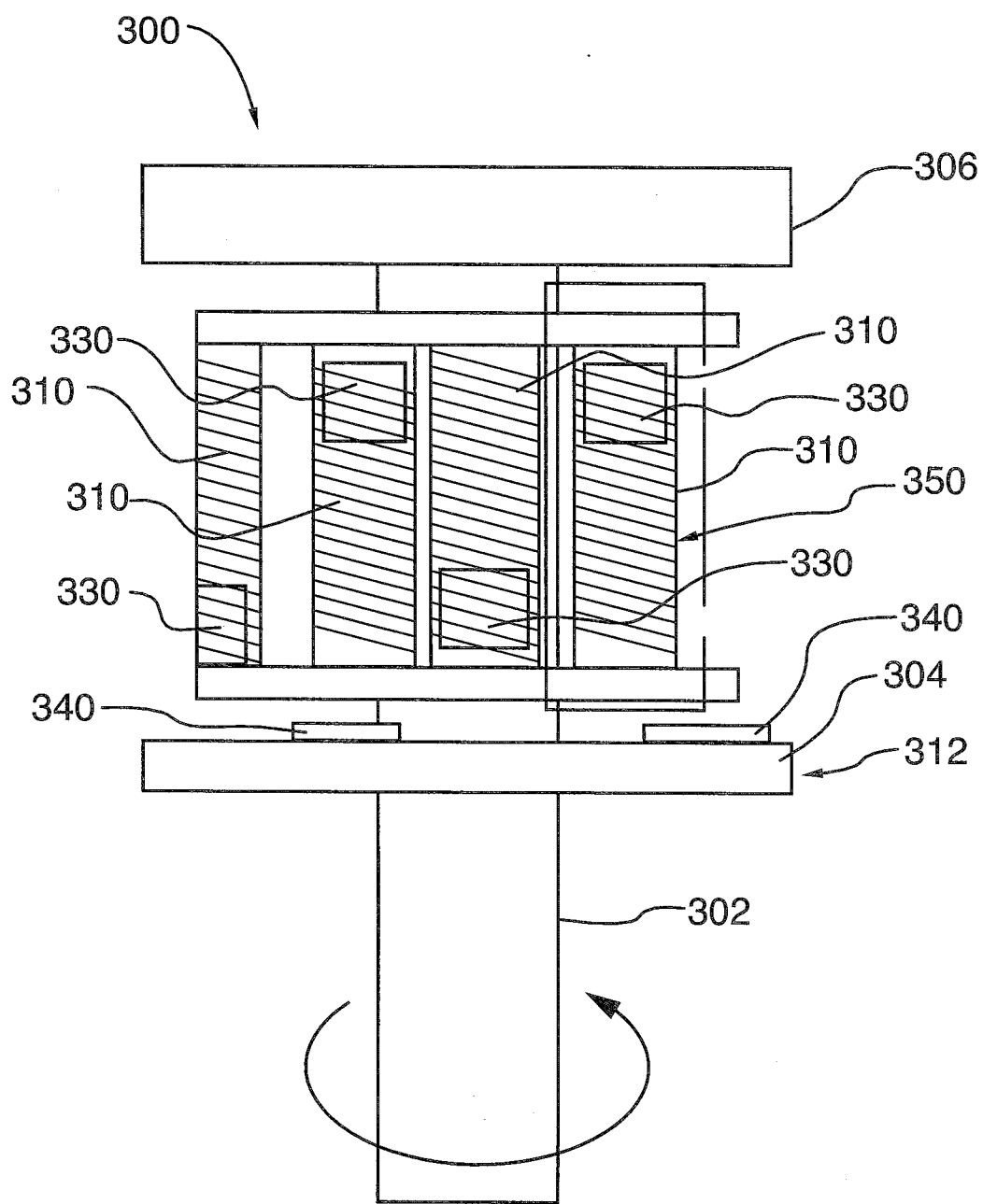
FIG. 3 is a cross-sectional view illustrating an embodiment of a rotor and tube assembly of an electrical generator operating on the principle illustrated in FIGS. 2A-C.

Referring now to FIG. 3, shown is a vertical axis electrical generator 300 having a rotor assembly 312 that can have one or more rotor magnets 340 attached thereto that interact with induction magnets 330 each contained in a tube 310 of a tube assembly 350. Each tube 310 has an induction coil (e.g. a wire helically wrapped around the tube) for inducing a current from the movement of induction magnet 330. Tubes 310 can be arranged toroidally in tube assembly 350 around shaft 302 of rotor assembly 312. Tube assembly 350 is attached in a fixed position such that rotation of rotor assembly 312 causes rotor magnets 340 to move in a plane perpendicular to the axis of tubes 310.

Rotor magnets 340 can be mounted on a lower disk 304 of rotor assembly 312 and are sufficiently spaced from one another to allow induction magnets 330 to descend within the tubes 310 due to gravity prior to the magnetic field of the next rotor magnet 340 interacting with the magnetic field of induction magnet 330 that would cause it to rise. This spacing results in more tubes 310 in the tube assembly than rotor magnets 340 on rotor assembly 312. The rotor assembly 312 may also include an upper disk 306 which is described further below.

Rotor assembly 312 can be mechanically coupled to a turbine to impart rotational force to cause the rotor magnets 340 to move with respect to static tube assembly 350. In some embodiments, the turbine can be coupled to the rotor assembly 312 using gears. In vertical axis wind turbine embodiments, for example, such as that illustrated in U.S. Pat. No. 8,013,464 to Stern, et al, which is incorporated herein by reference, blades of the turbine can be directly attached to the rotor assembly 312 of electrical generator 300. This simplifies the design and removes any inefficiencies introduced by gear-based designs.

Some embodiments can include a tube assembly 350 having multiple induction magnets within a tube 310 and multiple sets of induction coils 220. This can allow multiphase power generation such as three-phase power generation which is the standard used for most generators.

Induction magnets 330 and rotor magnets 340 can be permanent magnets. In some embodiments, rare earth permanent magnets can be used. Rare earth magnets produce a compact high-strength magnet. The most common types of rare-earth magnets are samarium-cobalt and neodymium-iron-boron ("NIB") magnets. In some embodiments, rotor magnets 340 can be electromagnets that are used to repel induction magnets 330.

The movement of induction magnet 330 can be damped by air pressure on either side of it within the tube 310, if it has too little clearance with the inside of the tube. In one embodiment, tube assembly 350 is capped at each end and under vacuum to limit the effects of air pressure. In one embodiment, induction magnets 330 have a tight tolerance to the interior diameter of the tube 310 so that the induction coils of the tube assembly 350 have an increased exposure to the magnetic field of induction magnet 330. Each end of the tube assembly 350 can also have a cap magnet (not shown) that has a magnetic moment opposed to induction magnet 330 to prevent induction magnet 330 from reaching the end of the tube assembly 310.

According to one embodiment, there may be provided a smaller magnet (e.g. a cap magnet) attached to the bottom end of the sealed linear generator 300 with like poles facing the induction magnet 330 within the linear generator 300 that prevents the magnet 330 within the linear generator 300 from hitting the bottom of the sealed linear generator 300. This arrangement may also be used at the top end of the sealed linear generator 300, preventing the magnet 330 within the linear generator 300 from hitting the top of the sealed linear generator 330 when acted upon by attractive forces of the secondary rotor magnet 340 on the rotor with a dissimilar pole attracting the magnet 330 within the linear generator 300. The end cap magnets described herein may be used in both vertically and horizontally mounted generators (e.g. FIGS. 3 and 4).

In other embodiments, induction magnet 330 can also be shaped to mitigate the effects of air pressure. A relatively large clearance between the diameter of induction magnets 330 and the inside diameter of tube 310 will allow air to move easily around induction magnet 330. In other embodiments, the induction magnets 330 can have holes co-axial with the longitudinal axis of tube 310, such as a toroidally shaped magnet, for example, such that air will be free to pass through them and not damp the magnet's movement. In still other embodiments, tube 310 can also be constructed to allow air to escape at its ends, such as by holes in both end portions, to limit air dampening of induction magnet 330.

Figure 4:
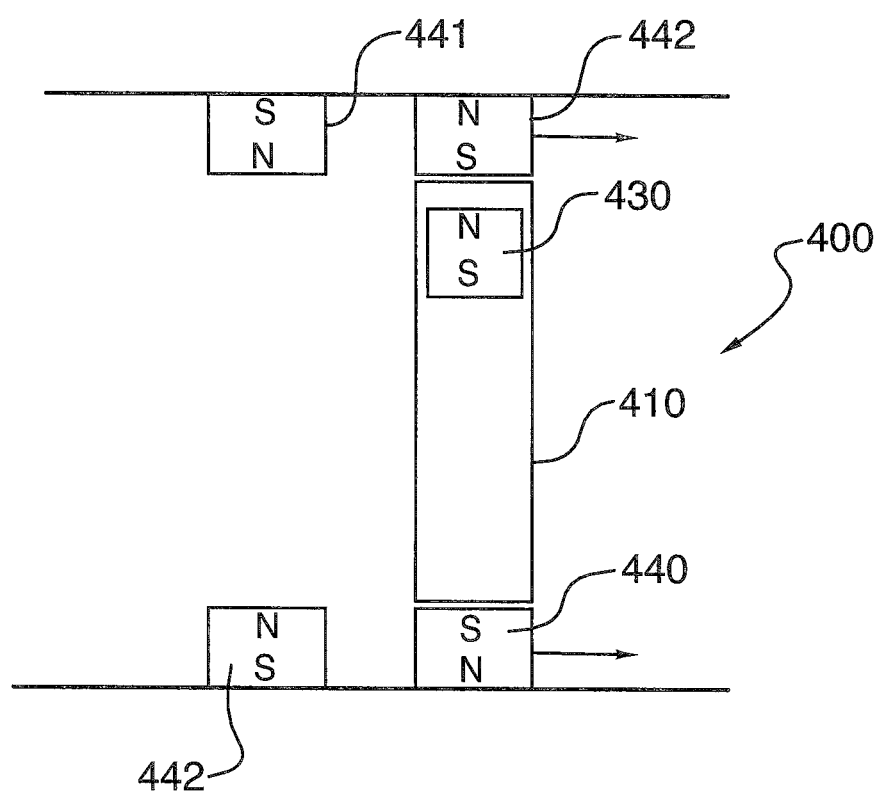
FIG. 4 is a cross-sectional view illustrating an embodiment of an electrical generator including additional rotor magnets to allow horizontal orientation of the electrical generator.

Referring now to FIG. 4, shown is an alternate embodiment of an electrical generator 400 that can be used in a horizontal orientation of tube 410. Electrical generator 400 operates similarly to that of electrical generator 200 illustrated in FIGS. 2A-C and similar parts are similarly numbered. In a horizontal orientation, additional magnets can be used on the rotor assembly to provide an opposing force on induction magnet 430 that is supplied by gravity in electrical generator 200 of FIGS. 2A-C. Rotor assembly 312 of FIG. 3 can be horizontally oriented by including additional rotor magnets on upper disk 306 as will be described with respect to FIG. 4.

Secondary rotor magnet 441 can be placed on an opposing end of tube 410 from rotor magnet 440 and offset from rotor magnet 440 to repel induction magnet 430 in the opposite direction (i.e. back towards rotor magnet 440). Secondary rotor magnet 441 has the same magnetic moment as rotor magnet 440. As the rotor assembly is in motion, first, rotor magnet 440 will repel induction magnet 430 away (i.e. upwards in FIG. 4). As the rotor assembly moves with respect to tube 410 (i.e. from left to right in FIG. 4), the field of secondary rotor magnet 441 can interact with induction magnet 430 causing it to move in the opposite direction (i.e. downwards in FIG. 4). A rotor assembly can be designed with multiple sets of rotor magnet 440 and secondary rotor magnet 441 to cause induction magnet 430 to reciprocate within tube 410 to generate electromotive force in an induction coil wrapped around tube 410 to provide an alternating current.

A rotor assembly can also include an opposing rotor magnet 442 that is positioned opposite rotor magnet 440 and has an opposite magnetic moment to rotor magnet 440. In FIG. 4, as rotor magnet 440 repels induction magnet 430, opposing rotor magnet 442 attracts induction magnet 430. Secondary rotor magnet 441 can also have an opposing rotor magnet 442 positioned opposite to it that assists to move induction magnet 430 in an opposite direction from that of rotor magnet 440. The use of opposing rotor magnet 442 can be less preferable as the strong attractive force with induction magnet 430 must be limited.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

What is claimed is:

1. An electrical generator, comprising:
    a tube assembly having a vertical tube with an induction coil surrounding the vertical tube and an induction magnet within the vertical tube, the induction magnet moveable longitudinally within the vertical tube and through the induction coil; and,
    a rotor assembly having a rotor magnet, the rotor magnet positioned with an opposing magnetic moment to the induction magnet;
    wherein the rotor assembly is moved with respect to the tube assembly to cause the rotor magnet to move horizontally towards a lower end of the vertical tube, the rotor magnet repels the induction magnet causing it to move upwards within the vertical tube and through the induction coil to generate an electromotive force in the induction coil; and
    wherein as the rotor magnet moves horizontally away from the lower end of the vertical tube, the induction magnet drops downwards within the vertical tube due to gravity and generates a second electromotive force in the induction coil.

2. The electrical generator of claim 1, wherein the rotor magnet moves in a plane perpendicular to a longitudinal axis of the vertical tube.

3. The electrical generator of claim 1, wherein the induction coil is a wire helically wrapped around the vertical tube.

4. The electrical generator of claim 1, wherein the tube assembly has a plurality of induction magnets and a plurality of induction coils.

5. The electrical generator of claim 4, wherein the plurality of induction magnets and plurality of induction coils are configured to generate three-phase power.

6. The electrical generator of claim 1, further comprising a plurality of tube assemblies.

7. The electrical generator of claim 6, further comprising a plurality of rotor magnets on the rotor assembly.

8. The electrical generator of claim 7, wherein the rotor assembly further comprises a rotatable disk adjacent the lower end of the vertical tubes of the tube assembly, the rotatable disk having the plurality of rotor magnets disposed thereon.

9. The electrical generator of claim 8, wherein the plurality of tube assemblies are arranged toroidally.

10. The electrical generator of 9, wherein the rotor assembly further comprises a second rotatable disk coupled to the first rotatable disk, the second rotatable disk adjacent an opposing end of the vertical tubes of the tube assembly.

11. The electrical generator of claim 10, wherein the second rotatable disk comprises secondary rotor magnets offset from corresponding rotor magnets, the secondary rotor magnets configured to repel the induction magnets.

12. The electrical generator of claim 10, wherein the second rotatable disk comprises opposing rotor magnets positioned opposite from corresponding rotor magnets, the opposing rotor magnets configured to attract the induction magnets.

13. The electrical generator claim 1, wherein the rotor assembly is mechanically coupled to a turbine.

14. The electrical generator of claim 13, wherein the rotor assembly is directly coupled to blades of a vertical axis wind turbine.

15. The electrical generator of claim 1, wherein the induction magnet and rotor magnet are permanent magnets.

16. A method of generating electricity, comprising:
providing a tube assembly having a vertical tube with an induction coil surrounding the vertical tube and an induction magnet within the vertical tube, the induction magnet moveable longitudinally within the vertical tube and through the induction coil: and moving a rotor magnet horizontally towards a lower end of the vertical tube so that the rotor magnet repels the induction magnet causing it to move upwards within the vertical tube and through the induction coil to generate an electromotive force in the induction coil; and moving the rotor magnet horizontally away from the lower end of the vertical tube so that the induction magnet drops downwards within the vertical tube due to gravity to generate a second electromotive force in the induction coil.

* * * * *